United States Patent
Bakhmutsky et al.

(10) Patent No.: US 6,519,005 B2
(45) Date of Patent: Feb. 11, 2003

(54) METHOD OF CONCURRENT MULTIPLE-MODE MOTION ESTIMATION FOR DIGITAL VIDEO

(75) Inventors: Michael Bakhmutsky, Spring Valley, NY (US); Karl Wittig, New York, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/303,316

(22) Filed: Apr. 30, 1999

(65) Prior Publication Data

US 2002/0176500 A1 Nov. 28, 2002

(51) Int. Cl.⁷ ................................................. H04N 7/18
(52) U.S. Cl. .................................... 348/415; 375/240.17
(58) Field of Search ........................ 375/240.11–240.17

(56) References Cited

U.S. PATENT DOCUMENTS

| | | | |
|---|---|---|---|
| 5,412,435 A | 5/1995 | Nakajima | 348/699 |
| 5,813,197 A | 9/1998 | Chan et al. | 348/416 |
| 5,905,542 A * | 5/1999 | Linzer | 348/699 |
| 5,963,673 A * | 10/1999 | Kodama et al. | 382/239 |
| 6,049,362 A * | 4/2000 | Butter et al. | 348/699 |
| 6,081,622 A * | 6/2000 | Carr et al. | 382/236 |
| 6,144,323 A * | 11/2000 | Wise | 341/76 |

FOREIGN PATENT DOCUMENTS

| | | | | |
|---|---|---|---|---|
| EP | 0654946 A1 | 5/1995 | | H04N/7/13 |
| EP | 0658057 A2 | 6/1995 | | H04N/7/36 |
| EP | 0695097 A2 | 1/1996 | | H04N/7/50 |
| EP | 0898426 A1 | 2/1999 | | H04N/7/30 |

* cited by examiner

Primary Examiner—Andy S. Rao
(74) Attorney, Agent, or Firm—Russell Gross

(57) ABSTRACT

A method for motion coding an uncompressed digital video data stream such as an MPEG-2 digital video data stream. The method includes the steps of comparing pixels of a first pixel array in a picture currently being coded with pixels of a plurality of second pixel arrays in at least one reference picture and concurrently performing motion estimation for each of a plurality of different prediction modes in order to determine which of the prediction modes is an optimum prediction mode determining which of the second pixel arrays constitutes a best match with respect to the first pixel array for the optimum prediction mode, and, generating a motion vector for the first pixel array in response to the determining step. The method is implemented in a device such as a motion estimation search system of a digital video encoder. In one embodiment, the method and device are capable of concurrently determining performing motion estimation in each of the six different possible prediction modes specified by the MPEG-2 standard.

42 Claims, 8 Drawing Sheets

METHOD OF CONCURRENT MULTIPLE-MODE MOTION ESTIMATION FOR DIGITAL VIDEO

BACKGROUND OF THE INVENTION

The present invention relates generally to digital video compression, and, more particularly, to a motion estimation method and search engine for a digital video encoder that is simpler, faster, and less expensive than the presently available technology permits, and that permits concurrent motion estimation using multiple prediction modes.

Many different compression algorithms have been developed in the past for digitally encoding video and audio information (hereinafter referred to generically as "digital video data stream") in order to minimize the bandwidth required to transmit this digital video data stream for a given picture quality. Several multimedia specification committees have established and proposed standards for encoding/compressing and decoding/decompressing audio and video information. The most widely accepted international standards have been proposed by the Moving Pictures Expert Group (MPEG), and are generally referred to as the MPEG-1 and MPEG-2 standards. Officially, the MPEG-1 standard is specified in the ISO/IEC 11172-2 standard specification document, which is herein incorporated by reference, and the MPEG-2 standard is specified in the ISO/IEC 13818-2 standard specification document, which is also herein incorporated by reference. These MPEG standards for moving picture compression are used in a variety of current video playback products, including digital versatile (or video) disk. (DVD) players, multimedia PCs having DVD playback capability, and satellite broadcast digital video. More recently, the Advanced Television Standards Committee (ATSC) announced that the MPEG-2 standard will be used as the standard for Digital HDTV transmission over terrestrial and cable television networks. The ATSC published the *Guide to the Use of the ATSC Digital Television Standard* on Oct. 4, 1995, and this publication is also herein incorporated by reference.

In general, in accordance with the MPEG standards, the audio and video data comprising a multimedia data stream (or "bit stream") are encoded/compressed in an intelligent manner using a compression technique generally known as "motion coding". More particularly, rather than transmitting each video frame in its entirety, MPEG uses motion estimation for only those parts of sequential pictures that vary due to motion, where possible. In general, the picture elements or "pixels" of a picture are specified relative to those of a previously transmitted reference or "anchor" picture using differential or "residual" video, as well as so-called "motion vectors" that specify the location of a 16-by-16 array of pixels or "macroblock" within the current picture relative to its original location within the anchor picture. Three main types of video frames or pictures are specified by MPEG, namely, I-type, P-type, and B-type pictures.

An I-type picture is coded using only the information contained in that picture, and hence, is referred to as an "intra-coded" or simply, "intra" picture.

A P-type picture is coded/compressed using motion compensated prediction (or "motion estimation") based upon information from a past reference (or "anchor") picture (either I-type or P-type), and hence, is referred to as a "predictive" or "predicted" picture.

A B-type picture is coded/compressed using motion compensated prediction (or "motion estimation") based upon information from either a past and or a future reference picture (either I-type or P-type), or both, and hence, is referred to as a "bidirectional" picture. B-type pictures are usually inserted between I-type or P-type pictures, or combinations of either.

The term "intra picture" is used herein to refer to I-type pictures, and the term "non-intra picture" is used herein to refer to both P-type and B-type pictures. It should be mentioned that although the frame rate of the video data represented by an MPEG bit stream is constant, the amount of data required to represent each frame can be different, e.g., so that one frame of video data (e.g., $\frac{1}{30}$ of a second of playback time) can be represented by x bytes of encoded data, while another frame of video data can be represented by only a fraction (e.g., 5%) of x bytes of encoded data. Since the frame update rate is constant during playback, the data rate is variable.

Figure 1A:
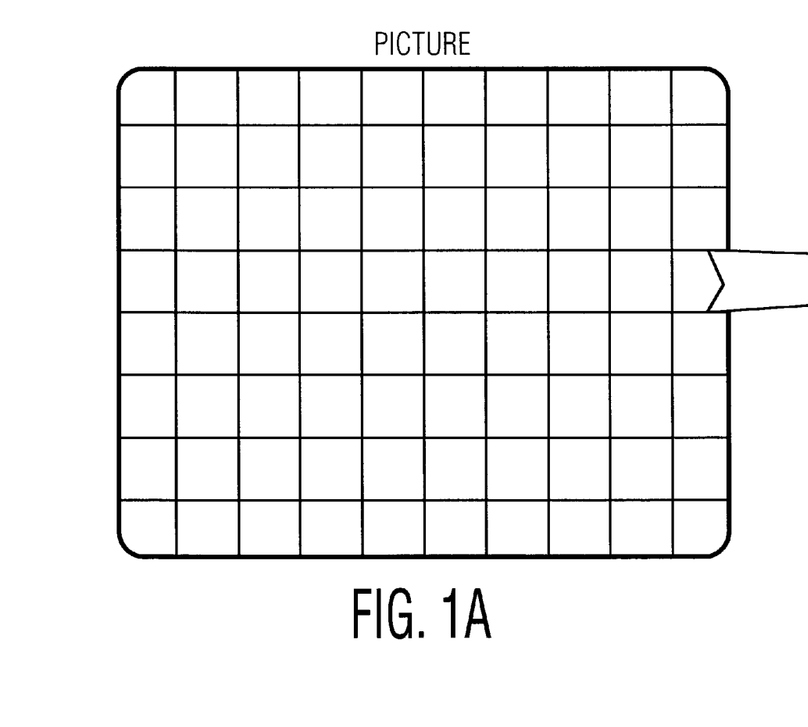
FIG. 1 is a diagram that illustrates the MPEG picture and macroblock structure.
Figure 1B:
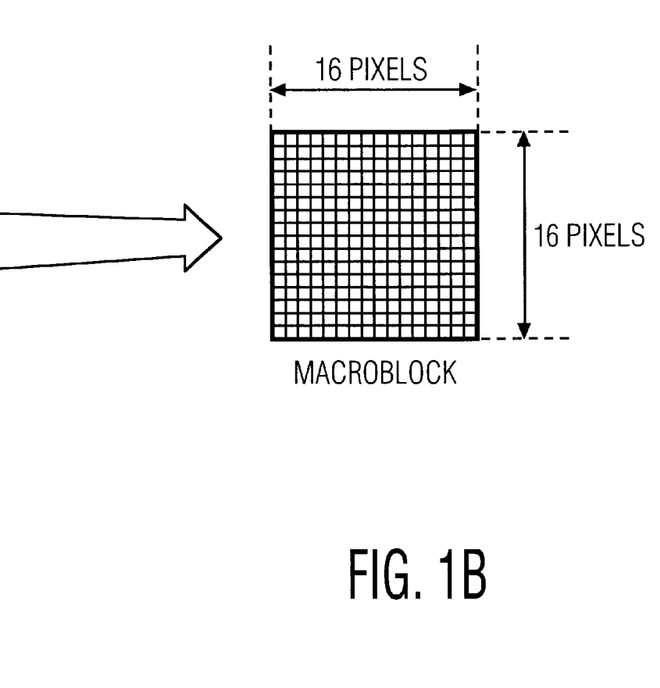

In general, the encoding of an MPEG video data stream requires a number of steps. The first of these steps consists of partitioning each picture into macroblocks. Next, in theory, each macroblock of each "non-intra" picture in the MPEG video data stream is compared with all possible 16-by-16 pixel arrays located within specified vertical and horizontal search ranges of the current macroblock's corresponding location in the anchor picture(s). The MPEG picture and macroblock structure is diagrammatically illustrated in FIG. 1.

The aforementioned search or "motion estimation" procedure, for a given prediction mode, results in a motion vector(s) that corresponds to the position of the closest-matching macroblock (according to a specified matching criterion) in the anchor picture(s) within the specified search range. Once the prediction mode and motion vector(s) have been determined, the pixel values of the closest-matching macroblock are subtracted from the corresponding pixels of the current macroblock, and the resulting 16-by-16 array of differential pixels is then transformed into 8-by-8 "blocks," on each of which is performed a discrete cosine transform (DCT), the resulting coefficients of which are each quantized and Huffman-encoded (as are the prediction type, motion vectors, and other information pertaining to the macroblock) to generate the MPEG bit stream. If no adequate macroblock match is detected in the anchor picture, or if the current picture is an intra, or "I-" picture, the above procedures are performed on the actual pixels of the current macroblock (i.e., no difference is taken with respect to pixels in any other picture), and the macroblock is designated an "intra" macroblock.

For all MPEG-2 prediction modes, the fundamental technique of motion estimation consists of comparing the current macroblock with a given 16-by-16 pixel array in the anchor picture, estimating the quality of the match according to the specified metric, and repeating this procedure for every such 16-by-16 pixel array located within the search range. The hardware or software apparatus that performs this search is usually termed the "search engine," and there exists a number of well-known criteria for determining the quality of the match. Among the best-known criteria are the Minimum Absolute Error (MAE), in which the metric consists of the sum of the absolute values of the differences of each of the 256 pixels in the macroblock with the corresponding pixel in the matching anchor picture macroblock; and the Minimum Square Error (MSE), in which the metric consists of the sum of the squares of the above pixel differences. In either case, the match having the smallest value of the corresponding sum is selected as the best match within the specified search range, and its horizontal and vertical positions relative to the current macroblock therefore constitute the motion vector. If the resulting minimum sum is nevertheless deemed to large, a suitable match does not exist for the current macroblock, and it is coded as an intra macroblock. For the purposes of the present invention, either of the above two criteria, or any other suitable criterion, may be used.

In accordance with the MPEG-2 standard, any of a number of so-called "prediction modes" may be used for each individual macroblock that is encoded; the optimum prediction mode depends both on the type of picture being encoded and on the characteristics of the portion of the picture in which the given macroblock being encoded is located. Currently known methods of motion coding allow the use of different prediction modes, but generally require one prediction mode to be specified for a given macroblock before an actual motion estimation is performed. Although such a determination can often be made based upon prior knowledge of the picture or image source characteristics, there are many cases where the optimum prediction mode cannot be known unless more than one motion estimation is performed for the macroblock in question. Since motion estimation usually consists of an exhaustive search procedure in which all 256 pixels of two corresponding macroblocks are compared, and which is repeated for a large number of macroblocks, the latter is not a practical option.

Computation of the motion vector(s) for a given macroblock is typically performed by means of an exhaustive search procedure. The current macroblock in question is "compared" with a macroblock-sized pixel array within the anchor picture that is offset by an amount less than specified vertical and horizontal distances, called the "search ranges," and an "error" value is computed for this particular "match" of the macroblock using a specified criterion, or "metric," that gives a measure of how large the error is. This is done for every possible combination of vertical and horizontal offset values within the respective search ranges, and the offset pair that yields the smallest error according to the chosen metric is selected as the motion vector for the current macroblock relative to the anchor picture. Clearly, this procedure is very computationally intensive.

Based on the above and foregoing, it can be appreciated that there presently exists a need in the art that overcomes the disadvantages and shortcomings of the presently available technology. The present invention fulfills this need in the art by performing motion coding of an uncompressed digital video sequence in such a manner that the prediction mode for each individual macroblock is determined as part of the motion estimation process, along with the actual motion vector(s), and need not be specified in advance; only the type of picture currently being coded need be known. Since the latter must be determined at a higher level of video coding than the macroblock layer, this method makes possible a much more efficient, as well as optimal, degree of video compression than would otherwise be possible using conventional methods of motion estimation. Further, the present invention provides a novel scheme for concurrently searching for the optimum macroblock match within the appropriate anchor picture according to each of a plurality of motion prediction modes during the same search operation for the given macroblock, without the need for a separate search to be performed on the same macroblock for each such mode. Since this search procedure is the single most complex and expensive aspect of motion estimation, in both time and hardware, such a method as the present invention will clearly result in a more efficient video image coding and compression than would otherwise be possible given the aforementioned practical limitations of the presently available technology.

Although the present invention was primarily motivated by the specific requirements of the ATSC standard, it can nevertheless be used with any digital video transmission or storage system that employs a video compression scheme, such as MPEG, in which motion coding with multiple prediction modes is used.

SUMMARY OF THE INVENTION

The present invention encompasses a method for motion coding an uncompressed digital video data stream such as an MPEG-2 digital video data stream. The method includes the steps of comparing pixels of a first pixel array in a picture currently being coded with pixels of a plurality of second pixel arrays in at least one reference picture and concurrently performing motion estimation for each of a plurality of different prediction modes in order to determine which of the prediction modes is an optimum prediction mode, determining which of the second pixel arrays constitutes a best match with respect to the first pixel array for the optimum prediction mode, and, generating a motion vector for the first pixel array in response to the determining step. The method is implemented in a device such as a motion estimation search system of a digital video encoder. In one embodiment, the method and device are capable of concurrently determining performing motion estimation in each of the six different possible prediction modes specified by the MPEG-2 standard.

The present invention also encompasses a method for motion coding a digital video data stream comprised of a sequence of pictures having top and bottom fields which includes the steps of comparing pixels of a first portion (e.g., 16-by-8 portion) of a current macroblock (e.g., a 16-by-16 macroblock) of the top field of a current picture with pixels of each of a plurality of correspondingly-sized portions of a macroblock of a top field of an anchor picture in accordance with a prescribed search metric, and producing a first error metric for each comparison; comparing pixels of the first portion (e.g., 16-by-8 portion) of the current macroblock of the top field of the current picture with pixels of each of the plurality of correspondingly-sized portions of a macroblock of a bottom field of the anchor picture in accordance with the prescribed search metric, and producing a second error metric for each comparison; comparing pixels of a second portion (e.g., 16-by-8 portion) of a current macroblock (e.g., a 16-by-16 macroblock) of the bottom field of the current picture with pixels of each of the plurality of correspondingly-sized portions of the macroblock of the top field of the anchor picture in accordance with the prescribed search metric, and producing a third error metric for each comparison; comparing pixels of the:second portion (e.g., a 16-by-8 portion) of the current macroblock of the bottom. field of the current picture with pixels of each of the plurality of correspondingly-sized portions of the macroblock of the bottom field of the anchor picture in accordance with the prescribed search metric, and producing a fourth error metric for each comparison; summing the first and fourth error metrics to produce a first composite error metric; summing the second and third error metrics to produce a second composite error metric; and, determining which of the first, second, third, and fourth error metrics, and first and second composite error metrics has the lowest value, and selecting one a plurality of possible motion estimation prediction modes on the basis of such determination. Preferably and advantageously, all of the comparing steps are performed concurrently, and both of the summing steps are performed concurrently. The plurality of possible motion estimation prediction modes can include frame and field prediction modes for frame pictures in accordance with the MPEG-2 standard.

The present invention also encompasses a method for motion coding a digital video data stream comprised of a sequence of pictures, in which the method includes the steps of comparing pixels of a first portion (e.g., 16-by-8 portion) of a top half of a current macroblock (e.g., a 16-by-16 macroblock) of a current picture with pixels of each of a plurality of correspondingly-sized portions of a macroblock of a top field of an anchor picture in accordance with a prescribed search metric, and producing a first error metric for each comparison; comparing pixels of the first portion (e.g., 16-by-8 portion) of the top half of the current macroblock of the current picture with pixels of each of the plurality of correspondingly-sized portions of a macroblock of a bottom field of the anchor picture in accordance with the prescribed search metric, and producing a second error metric for each comparison; comparing pixels of a second portion (e.g., 16-by-8 portion) of a bottom half of a current macroblock (e.g., a 16-by-16 macroblock) of the current picture with pixels of each of the plurality of correspondingly-sized portions of the macroblock of the top field of the anchor picture in accordance with the prescribed search metric, and producing a third error metric for each comparison; comparing pixels. of the second portion (e.g., a 16-by-8 portion) of the bottom half of the current macroblock of the current picture with pixels of each of the plurality of correspondingly-sized portions of the inacroblock of the bottom field of the anchor picture in accordance with the prescribed search metric, and producing a fourth error metric for each comparison; summing the first and third error metrics to produce a first composite error metric; summing the second and fourth error metrics to produce a second composite error metric; and, determining which of the first, second, third, and fourth error metrics, and first and second composite error metrics has the lowest value, and selecting one a plurality of possible motion estimation prediction modes on the basis of such determination. Preferably and advantageously, all of the comparing steps are performed concurrently, and both of the summing steps are performed concurrently. The plurality of possible motion estimation prediction modes can include field and 16×8 prediction modes for field pictures in accordance with the MPEG-2 standard.

The present invention also encompasses a method for motion coding a digital video data stream comprised of a sequence of pictures having top and bottom fields which includes the steps of comparing pixels of a first portion (e.g., 16-by-8 portion) of a current macroblock (e.g., a 16-by-16 macroblock) of the top field of a current picture with pixels of each of a plurality of correspondingly-sized portions of a macroblock of a top field of an anchor picture in accordance with a prescribed search metric, and producing a first error metric for each comparison; comparing pixels of the first portion (e.g., 16-by-8 portion) of the current macroblock of the top field of the current picture with pixels of each of the plurality of correspondingly-sized portions of a macroblock of a bottom field of the anchor picture in accordance with the prescribed search metric, and producing a second error metric for each comparison; comparing pixels of a second portion (e.g., 16-by-8 portion) of a current macroblock (e.g., a 16-by-16 macroblock) of the bottom field of the current picture with pixels of each of the plurality of correspondingly-sized portions of the macroblock of the top field of the anchor picture in accordance with the prescribed search metric, and producing a third error metric for each comparison; comparing pixels of the second portion (e.g., a 16-by-8 portion) of the current macroblock of the bottom field of the current picture with pixels of each of the plurality of correspondingly-sized portions of the macroblock of the bottom field of the anchor picture in accordance with the prescribed search metric, and producing a fourth error metric for each comparison; producing first, second, third, and fourth motion vectors on the basis of the first, second, third, and fourth error metrics, respectively; and, examining the first, second, third, and fourth motion vectors to determine whether a prescribed relationship between them is present, and, if so, selecting a frame picture dual-prime motion estimation prediction mode. Preferably and advantageously, all of the comparing steps are performed concurrently.

The present invention also encompasses a method for motion coding a digital video data stream comprised of a sequence of pictures, in which the method includes the steps of comparing pixels of a first portion (e.g., 16-by-8 portion) of a top half of a current macroblock (e.g., a 16-by-16 macroblock) of a current picture with pixels of each of a plurality of correspondingly-sized portions of a macroblock of a top field of an anchor picture in accordance with a prescribed search metric, and producing a first error metric for each comparison; comparing pixels of the first portion (e.g., 16-by-8 portion) of the top half of the current macroblock of the current picture with pixels of each of the plurality of correspondingly-sized portions of a macroblock of a bottom field of the anchor picture in accordance with the prescribed search metric, and producing a second error metric for each comparison; comparing pixels of a second portion (e.g., 16-by-8 portion) of a bottom half of a current macroblock (e.g., a 16-by-16 macroblock) of the current picture with pixels of each of the plurality of correspondingly-sized portions of the macroblock of the top field of the anchor picture in accordance with the prescribed search metric, and producing a third error metric for each comparison; comparing pixels of the second portion (e.g., a 16-by-8 portion) of the bottom half of the current macroblock of the current picture with pixels of each of the plurality of correspondingly-sized portions of the macroblock of the bottom field of the anchor picture in accordance with the prescribed search metric, and producing a fourth error metric for each comparison; summing the first and third error metrics to produce a first composite error metric; summing the second and fourth error metrics to produce a second composite error metric; producing first and second motion vectors on the basis of the first and second composite error metrics, respectively; and, examining the first and second motion vectors to determine whether a prescribed relationship between them is present, and if so, selecting a field picture dual-prime motion estimation prediction mode. Preferably and advantageously, all of the comparing steps are performed concurrently, both of the summing steps are performed concurrently, and both of the producing steps are performed concurrently.

The present invention further encompasses a device such as a motion estimation search system for a digital video encoder that concurrently implements any of the above-described methods of the present invention in any combination thereof.

BRIEF DESCRIPTION OF THE DRAWINGS

These and other objects, features, and advantages of the present invention will be readily understood from the following detailed description taken in conjunction with the accompanying drawings, in which.

DETAILED DESCRIPTION OF THE INVENTION

Figure 2A:
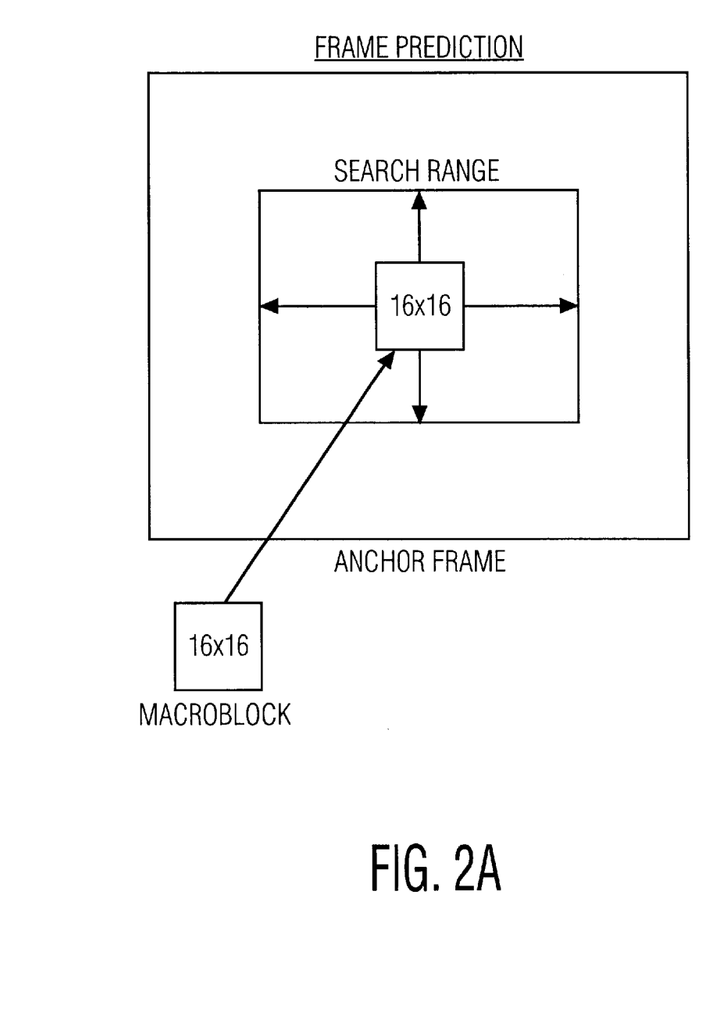
FIG. 2 is a diagram that illustrates motion estimation for frame pictures using frame and field prediction.
Figure 2B:
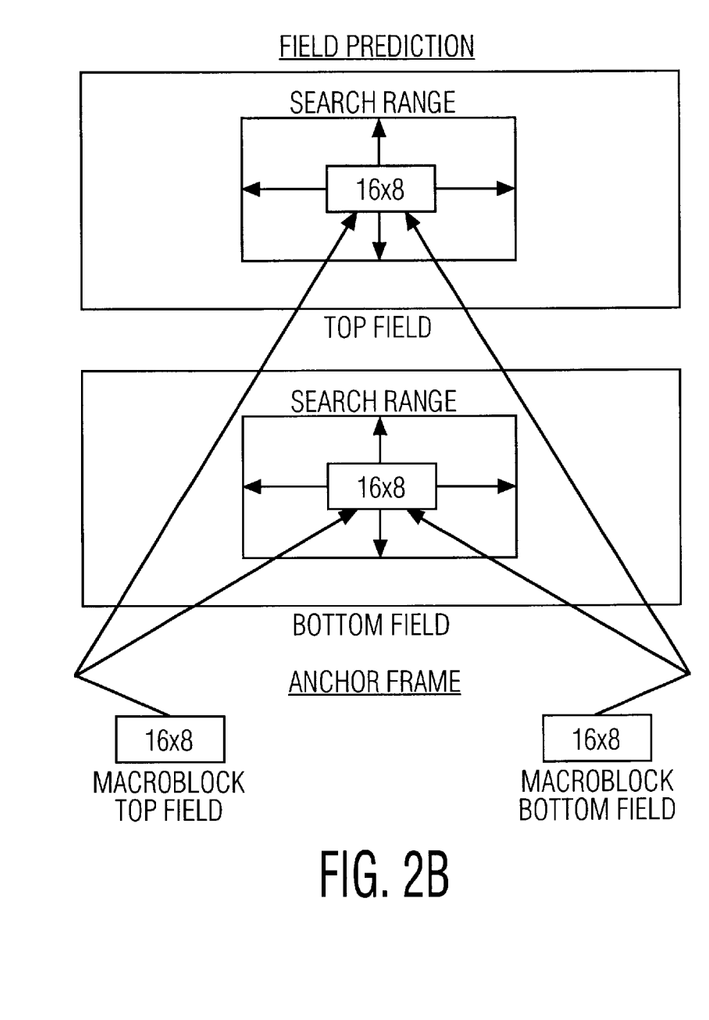

FIG. 2 diagrammatically depicts the MPEG-2 motion estimation process for frame pictures using the frame and field prediction modes, respectively. In frame prediction, the composite anchor frame is treated as a contiguous picture, and the composite macroblock is treated as a contiguous 16-by-16 pixel array. The motion estimation procedure is performed in the manner described hereinabove.

In field prediction, however, the current macroblock is partitioned into one 16-by-8 array consisting of lines from the top field (even-numbered lines, starting with 0), and a second, 16-by-8 array consisting of lines from the bottom field (odd-numbered lines, starting with 1). The anchor frame picture is also partitioned into a top-field picture (even-numbered lines) and a bottom-field picture (odd-numbered lines). The top-field 16-by-8 array is then matched, in a manner analogous to that described hereinabove, with every 16-by-8 pixel array within the search range in the top-field anchor. picture, in order to find the best match.

The procedure is then repeated, using the same top-field 16-by-8 array, in the bottom-field picture to find the best match. The two resulting matches are then compared, and the better of the two is selected as the best match for the top field of the macroblock. The match is represented by specifying the anchor field picture (top or bottom) in which it was found, along with the corresponding motion vector.

The entire procedure is repeated for the bottom-field 16-by-8 array, once again using both the top and bottom fields of the anchor frame in the manner described above to determine which of the two fields contains the better optimum match and to give its corresponding motion vector. The final result is an anchor field selector, motion vector pair for each of the top and bottom field 16-by-8 arrays of the current macroblock.

If the current picture is a predicted, or "P," picture, forward coding is used exclusively. In the case of a bidirectional, or "B," picture, however, the prediction may be forward, backward, or bidirectional. In the first two cases, the above motion estimation is performed using the forward or backward anchor picture, respectively, as required. In the case of bidirectional. coding, however, the same motion estimation must be performed for both the forward and the backward anchor picture. In a B picture, the prediction direction(s) is (are) specified individually for each macroblock of the current picture.

In all known motion estimation methods, the prediction mode must be specified for every macroblock before the motion estimation, with its constituent search, is performed. However, in accordance with the present invention, in one of its aspects, the motion estimation may be performed, in a frame picture, for both frame and field prediction modes simultaneously, during the same search of the anchor picture.

The observation that, for the same horizontal and vertical offset, the sum of the motion estimation match criterion, or metric, for the top-field 16-by-8 array in the top field of the anchor frame and that of the bottom-field 16-by-8 array in the bottom field of the anchor frame (in both cases using field prediction) is equal to the corresponding metric for the composite 16-by-16 macroblock array in the composite anchor frame (using frame prediction) illustrates how it is possible to perform motion estimation for more than one prediction mode during a single search. In order to accomplish this, the optimal match must be determined for each of the top- and bottom-field 16-by-8 arrays in each of the top- and bottom-field anchor pictures. If all searches are performed such that, at any given time, the horizontal and vertical offsets of the current attempted match are the same (a reasonable assumption in light of the fact that, in a practical motion estimation system, anchor picture pixels correspond to memory locations, which in conventional memory technologies are typically assessed only one at a time), a metric value is generated for each of the four attempted matches. If the current metric for the top-field 16-by-8 array in the top-field anchor picture is added to that for the bottom-field 16-by-8 array in the bottom-field anchor picture, the result, in the case of an even-numbered vertical offset is equal to the current metric for the composite 16-by-16 macroblock in the composite anchor frame. Just as the optimum metric values are determined for each of the four field prediction searches over the specified search range, the optimum metric value for frame prediction can also be determined from the above sum. In the case of an odd-numbered vertical offset, the top-field 16-by-16 pixel array is matched in the bottom field anchor picture, and the bottom-field 16-by-16 pixel array is matched in the top field anchor picture; the vertical pixel locations within the respective anchor field pictures will also differ by 1 in this case.

Figure 3:
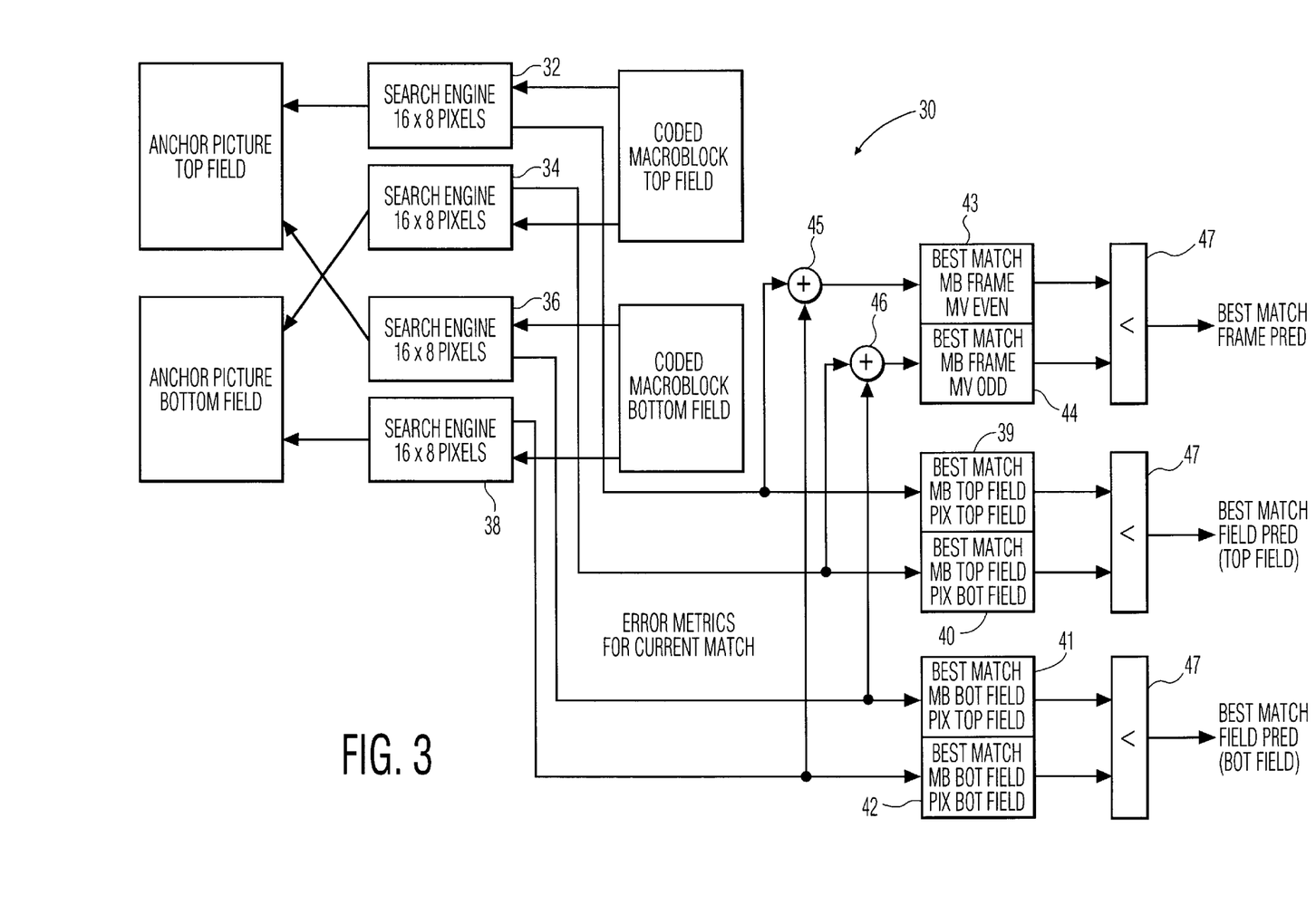
FIG. 3 is a block diagram of a motion estimation search system constructed in accordance with an exemplary embodiment of the present invention for concurrently performing motion estimation for frame prediction mode and field prediction modes for frame pictures.

A motion estimation search system 30 that implements the above-described motion estimation method of the present invention is depicted in FIG. 3, and will now be described. More particularly, the motion estimation search system 30 includes four parallel search engines 32, 34, 36, and 38 that compare respective portions of the coded macroblock top and bottom fields with appropriate portions of the anchor picture top and bottom fields in the manner described hereinabove, in accordance with a prescribed search metric, e.g., Minimum Absolute Error (MAE). The search engines 32, 34, 36, and 38 produce respective error metrics for each comparison operation they perform. In particular, the error metrics produced by the search engine 32 are applied to an input of a logic element 39 that determines which of the anchor picture top field macroblocks constitutes the best match with respect to the coded macroblock top field, and then and then produces the best match results at its output. The error metrics produced by the search engine 34 are applied to an input of a logic element 40 that determines which of the anchor picture bottom field macroblocks constitutes the best match with respect to the coded macroblock top field, and then produces the best match results at its output. The error metrics produced by the search engine 36 are applied to an input of a logic element 41 that determines which of the anchor picture top field macroblocks constitutes the best match with respect to the coded macroblock bottom field, and then produces the best match results at its output. The error metrics produced by the search engine 38 are applied to an input of a logic element 42 that determines which of the anchor picture bottom field macroblocks constitutes the best match with respect to the coded macroblock bottom field, and then produces the best match results at its output. The error metrics produced by the search engines 32 and 38 are combined by an adder circuit 45, and the resultant composite error metric is applied to an input of a logic element 43 that determines which of the anchor picture macroblocks constitutes the best match with respect to the coded macroblock for the case of an even-numbered vertical offset, and then produces the best match results at its output. The error metrics produced by the search engines 34 and 36 are combined by an adder circuit 46, and the resultant composite error metric is applied to an input of a logic element 44 that determines which of the anchor picture macroblocks constitutes the best match with respect to the coded macroblock for the case of an odd-numbered vertical offset, and then produces the best match results at its output. Parallel comparison logic elements 47 compare the best match results generated by the logic elements 39–44, and then determine which of the prediction modes (i.e., the field or frame prediction mode for frame pictures) is optimum for the coded macroblock on the basis thereof. The corresponding motion vector for the best match produced by the selected prediction mode is then output for further processing by the motion estimation search system.

The ATSC standard, which corresponds to the MPEG-2 main profile at high-level, allows as many as six different prediction modes. Of these, two were considered in the above description, namely the frame and field prediction modes in frame pictures, respectively. For field pictures, there are two analogous modes, namely field prediction, in which a 16-by-16 pixel macroblock in the current field picture is matched in one of the two previous anchor field pictures in a manner similar to that used for frame prediction in frame pictures; and 16-by-8 prediction, in which the upper 16-by-8 pixel half of the current macroblock is matched in either of the previous two anchor field pictures (and/or the following two anchor pictures in the case of backward coding in B pictures), and the lower half of the same macroblock is independently matched in either of the two previous anchor field pictures, this time in a manner similar to that used for field prediction in frame pictures. These two prediction modes for field pictures are illustrated diagrammatically in FIG. 4.

Figure 4A:
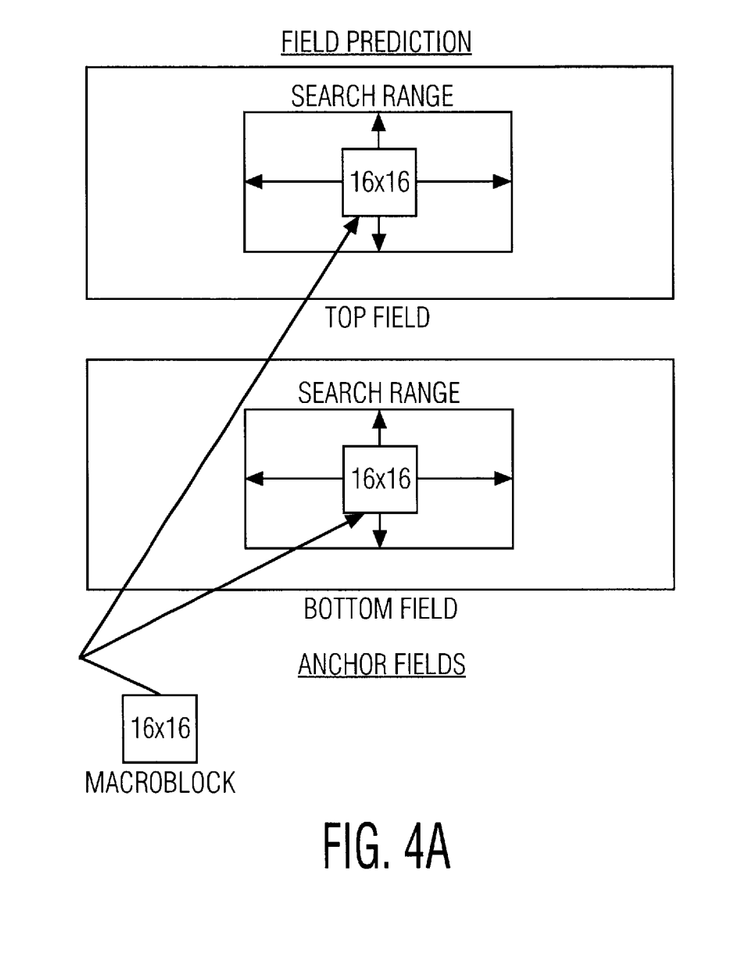
FIG. 4 is a diagram that illustrates motion estimation for field (16×16) and 16×8 prediction modes for field pictures.
Figure 4B:
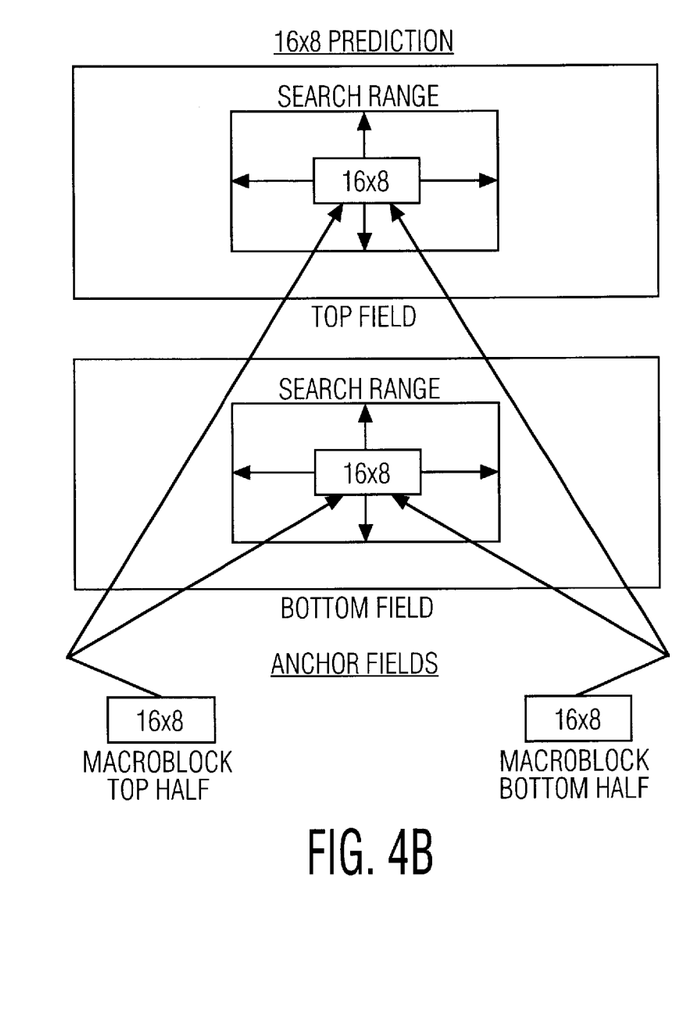

As before, all searches are performed such that, at any given time, the horizontal and vertical offsets of the four current attempted matches are the same, and a metric value is generated for each one. Since the relative offset for the upper half of the current macroblock with respect to the upper half of the attempted matching macroblock in either anchor field is the same as the relative offset for the lower half of the current macroblock with respect to the lower half of the same attempted match in either anchor field, separate metrics can be computed, during the full macroblock search, for the upper and lower halves of the current macroblock. If the metric value for the upper 16-by-8 array in the top-field anchor picture is added to that for the lower 16-by-8 array in the top-field anchor picture, the result is equal to the metric value for the composite 16-by-16 macroblock in the top-field anchor picture. The same holds true for the bottom-field anchor picture. Just as the optimum metric values are determined for each of the four 16-by-8 prediction searches over the specified search range, the optimum metric values for each of the two field prediction searches can also be determined from the above sums.

Figure 5:
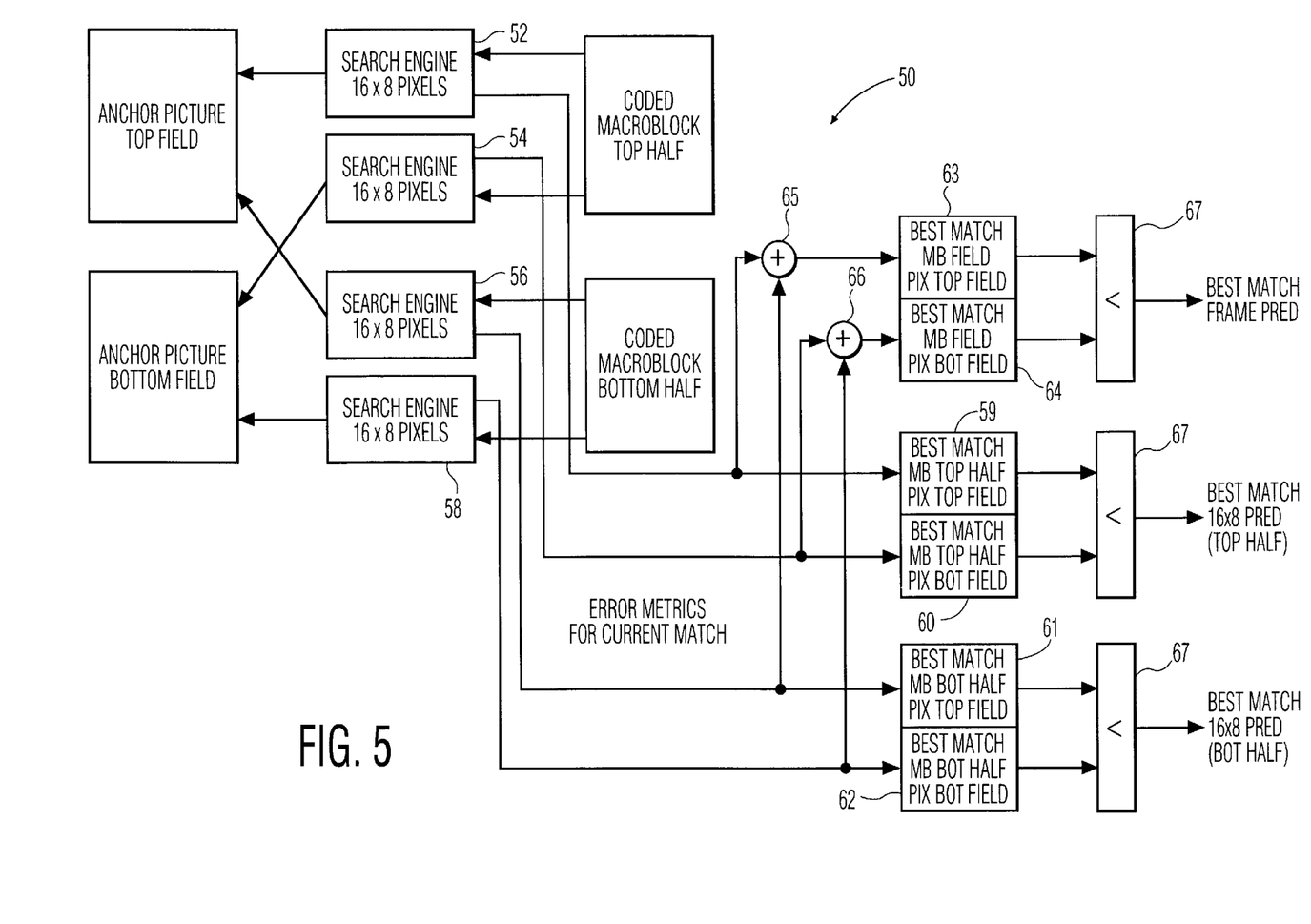
FIG. 5 is a block diagram of a motion estimation search system constructed in accordance with an exemplary embodiment of the present invention for performing motion estimation for field prediction and 16×8 prediction modes for field pictures.

A motion estimation search system 50 that implements the above-described motion estimation method of the present invention is depcited in FIG. 5, and will now be described. More particularly, the motion estimation search system 50 includes four parallel search engines 52, 54, 56, and 58 that compare respective portions of the coded macroblock top and bottom halves with appropriate portions of the anchor picture top and bottom fields in the manner described hereinabove, in accordance with a prescribed search metric, e.g., Minimum Absolute Error (MAE). The search engines 52, 54, 56, and 58 produce respective error metrics for each comparison operation they perform. In particular, the error metrics produced by the search engine 52 are applied to an input of a logic element 59 that determines which of the anchor picture top field macroblocks constitutes the best match with respect to the coded macroblock top half, and then and then produces the best match results at its output.

The error metrics produced by the search engine 54 are applied to an input of a logic element 60 that determines which of the anchor picture bottom field macroblocks constitutes the best match with respect to the coded macroblock top half, and then produces the best match results at its output.

The error metrics produced by the search engine 56 are applied to an input of a logic element 61 that determines which of the anchor picture top field macroblocks constitutes the best match with respect to the coded macroblock bottom half, and then produces the best match results at its output. The error metrics produced by the search engine 48 are applied to an input of a logic element 62 that determines which of the anchor picture bottom field macroblocks constitutes the best match with respect to the coded macroblock bottom half, and then produces the best match results at its output.

The error metrics produced by the search engines 52 and 56 are combined by an adder circuit 65, and the resultant composite error metric is applied to an input of a logic element 63 that determines which of the top field anchor picture macroblocks constitutes the best match with respect to the coded macroblock, and then produces the best match results at its output.

The error metrics produced by the search engines 54 and 58 are combined by an adder circuit 66, and the resultant composite error metric is applied to an input of a logic element 64 that determines which of the bottom field anchor picture macroblocks constitutes the best match with respect to the coded macroblock, and then produces the best match results at its output.

Parallel comparison logic elements 67 compare the best match results generated by the logic elements 59–64, and then determine which of the prediction modes (i.e., the field or 16-by-8 prediction mode for field pictures) is optimum for the coded macroblock on the basis thereof The corresponding motion vector for the best match produced by the selected prediction mode is then output for further processing by the motion estimation search system.

The final remaining MPEG-2 motion prediction mode is the so-called "dual-prime" mode, which may be used in cases where the source video is interlaced and where only I and P pictures are used in the encoding process (i.e., B pictures are not allowed). In this mode, which may be used in either frame or field pictures that meet the aforementioned criteria, advantage is taken of the physical properties of object motion within an interlaced video sequence to represent a plurality of motion vectors (four in the case of frame pictures, two in the case of field pictures) using just one encoded motion vector. This allows less information to be transmitted or stored per macroblock and, thereby results in more efficient video compression.

In interlaced video, each complete frame is partitioned into two separate fields, the first of which is designated the top field and consists of all even-numbered lines of the composite video frame (starting with 0), and the second of which is designated the bottom field and consists of all odd-numbered lines (starting with 1). In this mode of operation, the top-field image of a given frame is generated in its entirety, and the bottom field image of the same frame is subsequently generated, also in its entirety. The procedure is then repeated for the following frame, and then for all subsequent frames. In a video system with a specified frame rate (for example, 30 frames per second, with the NTSC standard, which is used in the United States), the corresponding field rate will be precisely twice this frame rate (60 fields per second in the case of the NTSC standard). This means that the time difference between two consecutive video fields is exactly half the time difference between two consecutive frames. Since most conventional video sources, such as cameras and recorders, generate lines of video in a sequential, raster-scan format, the time difference between corresponding lines (i.e., lines having the same vertical position) in consecutive fields will always have the same value, even if the times associated with different lines in the same field are different due to the constant vertical rate of the raster scan.

In a video sequence, an object that is moving with a uniform velocity will move by a finite distance within the image, vertically and horizontally, during the time interval between two consecutive frames. In the time between two consecutive fields, however, it will move by precisely half the aforementioned distance, according to the principles explained in the previous paragraph. In the more general case where the motion is not uniform, however, the small value of the time interval between subsequent frames (and the even smaller interval between subsequent fields), generally ensures that the second and higher-order derivatives of the object motion may be ignored, and that, over this small interval, the motion can safely be treated as uniform. This means that the above relationships concerning the distances of object motion between consecutive frames and that between consecutive fields, as well as the constancy of the motion between such fields, will effectively hold true even for non-uniform motion. The dual-prime mode of motion prediction capitalizes extensively on the above relationships.

Figure 6:
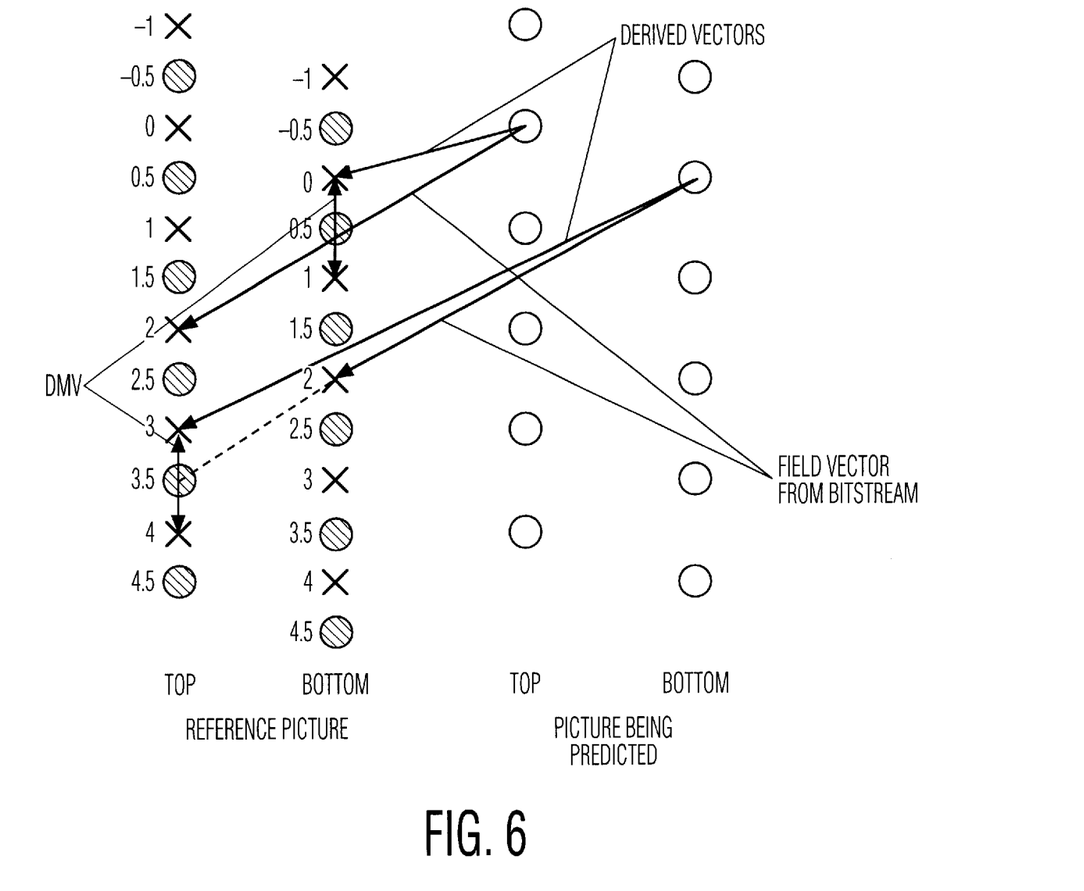
FIG. 6 is a diagram that illustrates motion estimation using dual-prime prediction.

The MPEG-2 specification for the dual-prime prediction modes in both frame and field pictures is diagrammatically depicted in FIG. 6. As can be seen from the illustration, motion vectors for fields of a given parity (e.g., top field) relative to the previous field of the same parity have a certain length. In a frame picture, where each of the two constituent fields is motion-coded relative to each of the two constituent fields of the previous anchor frame, the top-field to top-field and bottom-field to bottom-field vectors are seen to have the same length. This is expected according to the above analysis, since, in both cases, they represent the distance traveled by the object in the course of two video intervals. The motion vectors for fields of one parity relative to the opposite parity, however, will represent the distance traveled in one field interval (in the case of that for a top field relative to the previous bottom field), or three field intervals (in the case of that for a bottom field relative to the previous top field). In the former case, the motion vector will have a length of one-half the value of the above two motion vectors; in the latter case, it will have three-halves of this value.

In a field picture, which is motion-coded relative to the two previous anchor fields, the motion vector for the field of the same parity, once again, represents the distance traveled by the object in the course of two video field intervals, and has a certain length. The motion vector for the field of opposite parity, however, always refers to the previous field and, therefore, represents the distance traveled in one field interval; it will thus have one-half of the value of the above motion vector.

Upon initial examination, it appears that different fields must be searched for matches located at different horizontal and vertical offsets relative to the current macroblock in order to determine whether the above criteria for dual-prime representation are satisfied. Consideration of the fact that, in an interlaced video source, these criteria arise naturally from the properties of motion in a two-dimensional image, leads to the conclusion that, if all of the appropriate searches are performed, using the field prediction mode, for the current macroblock in the required anchor pictures, the resulting optimal motion vectors should automatically have the relative relationships required for dual-prime representation; that is, motion vectors corresponding to fields of the same parity should have a length of one-half or three-halves that of the above motion vector, depending upon the specific relationship between the fields. It is, therefore, only necessary to perform the conventional motion estimations for field prediction on either a frame picture or a field picture, and then examine the resulting motion vectors to determine whether the relative relationships required for dual-prime representation are present. If they are, the macroblock is simply encoded using the dual-prime prediction mode; if not, the most optimal of the other prediction modes is chosen instead.

In either a frame picture or a field picture, it is possible, due either to nonuniformity of motion or simply to spatial quantization of the image, that the relative relationships required for the motion vectors are very nearly, but not exactly, met. In addition, there always is a one-line vertical offset between the top and bottom fields of a video frame due to the nature of interlacing. The MPEG-2 standard accommodates the first of these situations by allowing a so-called "differential motion vector" for each of the vertical and horizontal components of the encoded vector, which is restricted to the three values −1, 0, and +1. It also accommodates the second situation by always providing a vertical correction for all derived motion vectors, which always predicts a field of a given parity relative to that of the opposite parity. In the event that the required relationships are still not exactly met, it is always possible to choose a slightly different motion vector value for the case that does not conform; although not precisely optimal, the overall superiority of dual-prime coding may nevertheless make this preferable in such a situation.

Figure 7:
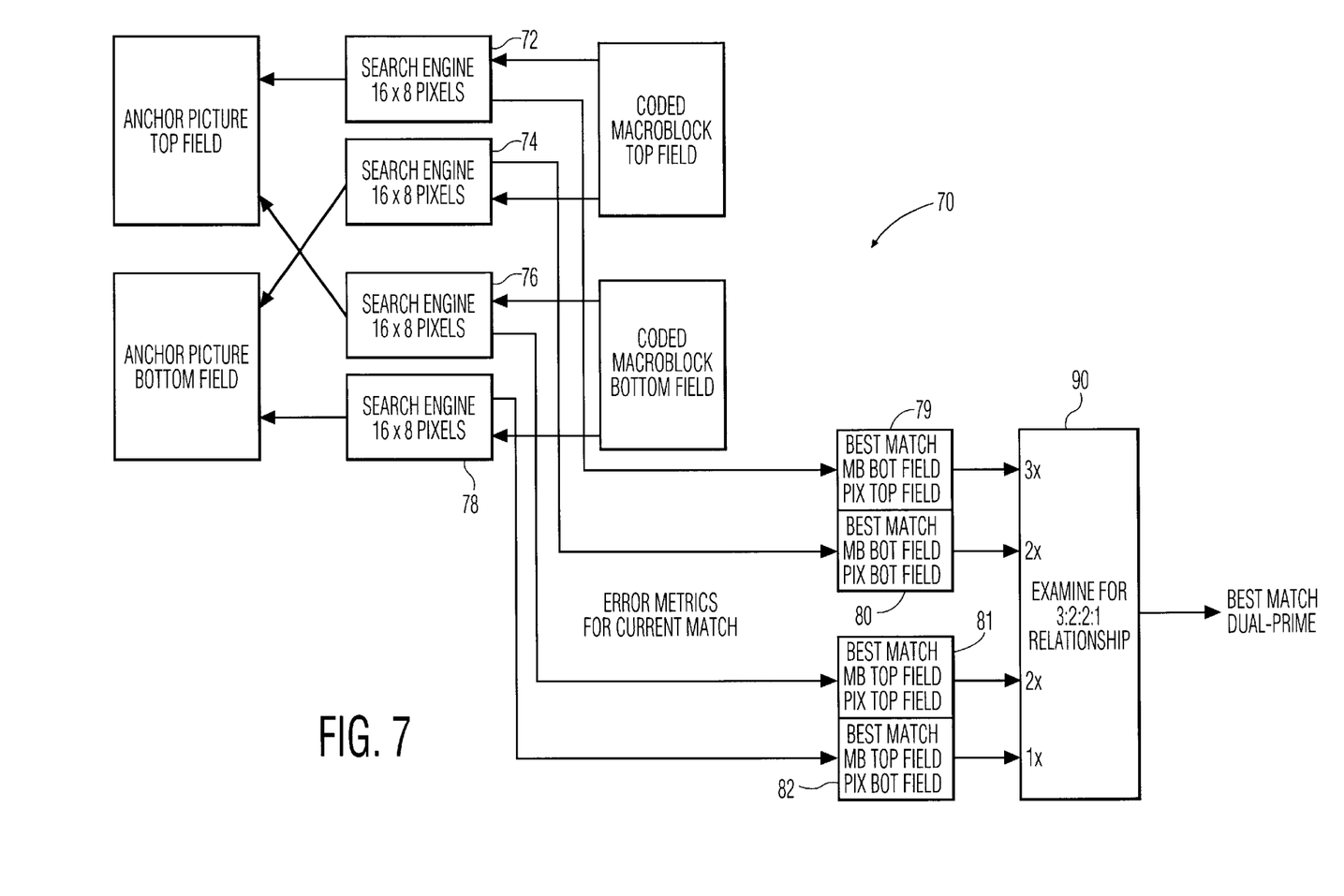
FIG. 7 is a block diagram of a motion estimation search system constructed in accordance with an exemplary embodiment of the present invention for performing frame picture dual-prime motion estimation; and, FIG. 8 is a block diagram of a motion estimation search system constructed in accordance with an exemplary embodiment of the present invention for performing field picture dual-prime motion estimation.

Dual-prime prediction for a frame picture consists of field prediction for the current macroblock relative to both fields of the previous anchor frame. This means that the top-field portion of the current macroblock is matched with both the top and bottom fields of the anchor frame (in contrast with conventional field prediction of frame pictures, where only the anchor field yielding the better prediction is chosen), and the same is done for the bottom-field portion of the current macroblock. Four motion vectors are therefore needed. The motion estimation system 30 depicted in FIG. 3, when used for field prediction, was designed to determine the optimum motion vectors for precisely the four matches required for dual-prime prediction in a frame picture. Consequently, the resultant four motion vectors need only be examined to determine whether the required relative relationships given in the above discussion holds among the four vectors. The same architecture used to simultaneously perform frame and field prediction in a frame picture, and select the better mode, can thus implement the dual-prime prediction mode and choose it over the other two prediction modes if superior to them as well. The resulting architecture of a motion estimation system 70 for motion estimation and coding of frame pictures is depicted in FIG. 7.

With specific reference to FIG. 7, the motion estimation system 70 includes four parallel search engines 72, 74, 76, and 78 that compare respective portions of the coded macroblock top and bottom fields with appropriate portions of the anchor picture top and bottom fields in the manner described hereinabove, in accordance with a prescribed search metric, e.g., Minimum Absolute Error (MAE). The search engines 72, 74, 76, and 78 produce respective error metrics for each comparison operation they perform. In particular, the error metrics produced by the search engine 72 are applied to an input of a logic element 79 that determines which of the anchor picture top field macroblocks constitutes the best match with respect to the coded macroblock top field, and then produces the corresponding motion vector at its output. The error metrics produced by the search engine 74 are applied to an input of a logic element 80 that determines which of the anchor picture bottom field macroblocks constitutes the best match with respect to the coded macroblock top field, and then produces the corresponding motion vector at its output. The error metrics produced by the search engine 76 are applied to an input of a logic element 81 that determines which of the anchor picture top field macroblocks constitutes the best match with respect to the coded macroblock bottom field, and then produces the corresponding motion vector at its output. The error metrics produced by the search engine 78 are applied to an input of a logic element 82 that determines which of the anchor picture bottom field macroblocks constitutes the best match with respect to the coded macroblock bottom field, and then produces the corresponding motion vector at its output. The motion vectors produced by the logic elements 79–82 are examined by a logic circuit 90 for a 3:2:2:1 relationship, and if such a relationship is determined to exist between these motion vectors, then a frame picture dual-prime motion estimation prediction mode is selected and the corresponding motion vector generated.

Figure 8:
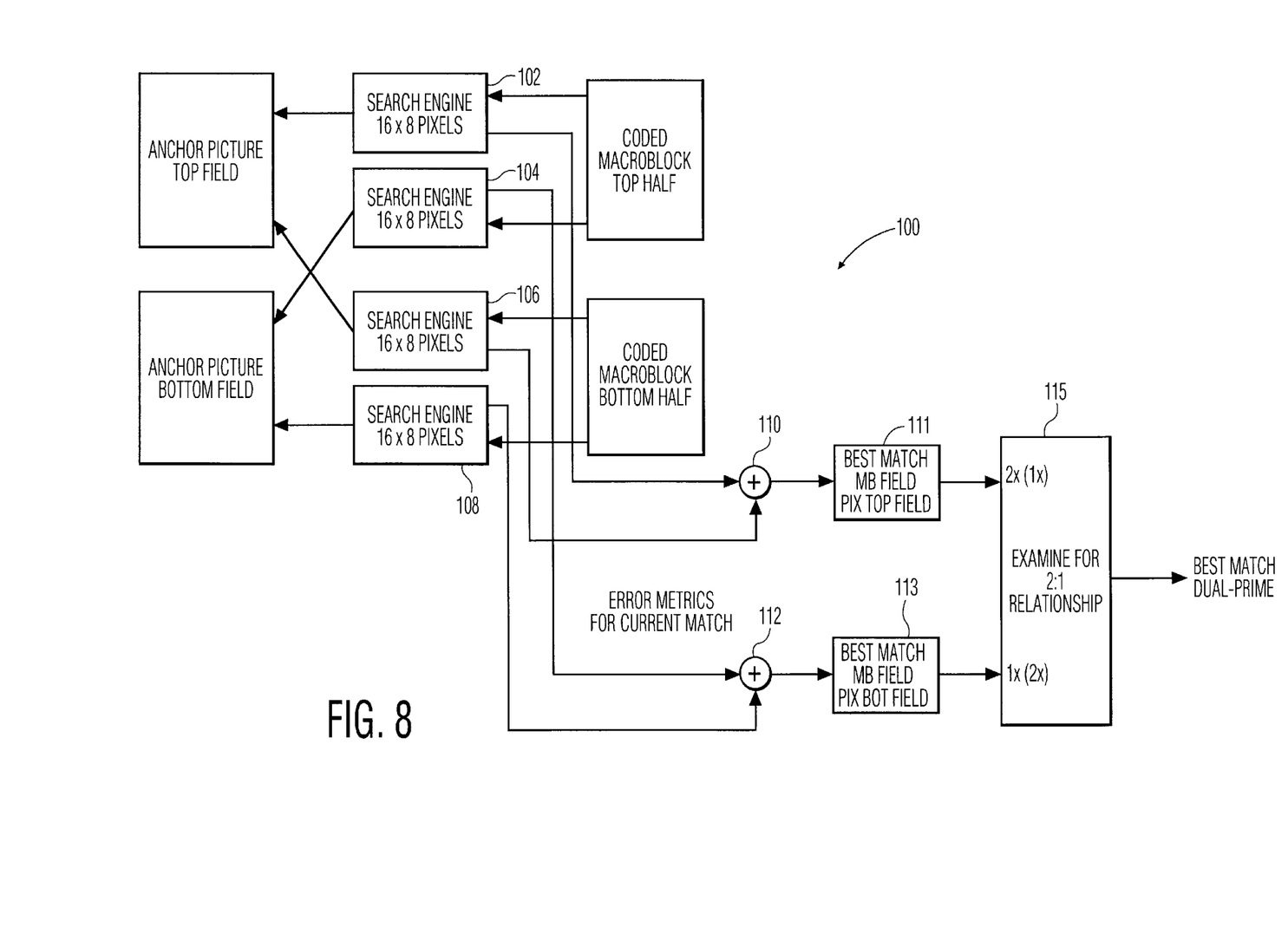

Dual-prime prediction for a field picture consists of field prediction for the current macroblock relative to the two previous anchor fields. This means that the current macroblock is matched with the previous top and bottom anchor fields (in contrast with conventional field prediction of field pictures, where only the anchor field yielding the better prediction is chosen). Two motion vectors are therefore needed. The motion estimation system 50 depicted in FIG. 5, when used for field prediction, was designed to determine the optimum motion vectors for precisely the two matches required for dual-prime prediction in a field picture. Consequently, these two motion vectors need only be examined to determine whether the required relative relationships given in the above discussion holds among the two vectors. The same architecture used to simultaneously perform field and 16-by-8 prediction in a field picture, and select the better mode, can thus implement the dual-prime prediction mode, and choose it over the other two modes if superior to them as well. The resulting architecture of a motion estimation system 100 for motion estimation and coding of field pictures is depicted in FIG. 8.

With specific reference to FIG. 8, the motion estimation system 100 includes four parallel search engines 102, 104, 106, and 108 that compare respective portions of the coded macroblock top and bottom halves with appropriate portions of the anchor picture top and bottom fields in the manner described hereinabove, in accordance with a prescribed search metric, e.g., Minimum Absolute Error (MAE). The search engines 102, 104, 106, and 108 produce respective error metrics for each comparison operation they perform. In particular, the error metrics produced by the search engine 102 are applied to a first input of a first adder 110, and the error metrics produced by the search engine 106 are applied to a second input of the first adder 110, which produces at its output the sum of the error metrics applied to its first and second inputs as a first composite error metric. The first composite error metric is applied to a logic element 111 that determines which of the anchor picture top field macroblocks constitutes the best match with. respect to the coded macroblock, and then produces the corresponding motion vector at its output. The error metrics produced by the search engine 104 are applied to a first input of a second adder 112, and the error metrics produced by the search engine 108 are applied to a second input of the second adder 112, which produces at its output the sum of the error metrics applied to its first and second inputs as a second composite error metric. The second composite error metric is applied to a logic element 113 that determines which of the anchor picture bottom field macroblocks constitutes the best match with respect to the coded macroblock, and then produces the corresponding motion vector at its output. The motion vectors produced by the logic elements 111 and 113 are examined by a logic circuit 115 for a 2:1 relationship, and if such a relationship is determined to exist between these motion vectors, then a field picture dual-prime motion estimation prediction mode is selected and the corresponding motion vector generated.

The similarities between the techniques and architectures described for motion estimation of frame pictures and field pictures immediately suggests that a unified architecture can be implemented which supports all three prediction modes allowed for frame pictures as well as all three prediction modes allowed for field pictures. Combining all of the techniques previously described, such an architecture requires knowledge only of the picture structure (frame or field) and type (I, P, or B) to determine the optimal prediction mode (i.e., the mode that yields the smallest value of the error metric) and its corresponding motion vector(s) for any macroblock, and need only perform a single search operation to do so. When implemented using custom hardware, as required for real-time video (e.g., a live broadcast), motion estimation is the most hardware-intensive and expensive operation in a digital video coding system. When implemented in computer software, as is usually done when the coding need not be performed in real-time (e.g., the coding of a DVD), the motion estimation algorithm is the most computationally complex and intensive part of the digital video coding algorithm. In either case, the methods and architectures of the present invention result in a means of significantly improving the video compression efficiency and, hence, the resulting picture quality, without the need for either greater hardware costs or higher computational complexity.

Although preferred embodiments of the present invention have been described in detail hereinabove, it should be clearly understood that many variations and/or modifications of the basic inventive concepts taught herein that may appear to those skilled in the pertinent art will still fall within the spirit and scope of the present invention, as defined in the appended claims.

What is claimed is:

1. A method for motion coding an uncompressed digital video data stream, including the steps of:

comparing pixels of a first pixel array in a picture currently being coded with pixels of a plurality of second pixel arrays in at least one reference picture and concurrently performing motion estimation for each of a plurality of different prediction modes in order to determine which of the prediction modes is an optimum prediction mode;

determining which of the second pixel arrays constitutes a best match with respect to the first pixel array for the optimum prediction mode; and, generating a motion vector for the first pixel array in response to the determining step.

2. The method as set forth in claim 1, wherein the first and second pixel arrays each have a size and structure defined by an MPEG standard.

3. The method as set forth in claim 1, wherein the method is implemented using a motion estimation search engine of a digital video encoder.

4. The method as set forth in claim 3, wherein the digital video encoder is an MPEG-2 digital video encoder.

5. The method as set forth in claim 1, wherein the motion coding is performed in accordance with an MPEG standard.

6. The method as set forth in claim 5, further comprising the initial step of providing information identifying a picture type of the first pixel array and using this information in the comparing step.

7. The method as set forth in claim 5, wherein the different prediction modes are:

frame prediction mode for frame pictures;

field prediction mode for frame pictures;

field prediction mode for field pictures;

16×8 prediction mode for field pictures;

dual-prime prediction mode for field pictures; and, dual-prime prediction mode for frame pictures.

8. The method as set forth in claim 1, wherein the different prediction modes are:

frame prediction mode for frame pictures; and, field prediction mode for frame pictures.

9. The method as set forth in claim 1, wherein the different prediction modes are:

field prediction mode for field pictures; and,

16×8 prediction mode for field pictures.

10. The method as set forth in claim 8, wherein the different prediction modes further include a dual-prime prediction mode for frame pictures.

11. The method as set forth in claim 9, wherein the different prediction modes further include a dual-prime prediction mode for field pictures.

12. The method as set forth in claim 1, wherein the different prediction modes are:

frame prediction mode for frame pictures;

field prediction mode for frame pictures;

field prediction mode for field pictures; and,

16×8 prediction mode for field pictures.

13. A device that implements the method set forth in claim 1.

14. A device that implements the method set forth in claim 7.

15. A device that implements the method set forth in claim 8.

16. A device that implements the method set forth in claim 9.

17. A method for motion coding a digital video data stream comprised of a sequence of pictures having top and bottom fields, the method including the steps of:

comparing pixels of a first portion of a current macroblock of the top field of a current picture with pixels of each of a plurality of correspondingly-sized portions of a macroblock of a top field of an anchor picture in accordance with a prescribed search metric, and producing a first error metric for each comparison;

comparing pixels of the first portion of the current macroblock of the top field of the current picture with pixels of each of the plurality of correspondingly-sized portions of a macroblock of- a bottom field of the anchor picture in accordance with the prescribed search metric, and producing a second error metric for each comparison;

comparing pixels of a second portion of a current macroblock of the bottom field of the current picture with pixels of each-of the plurality of correspondingly-sized portions of the macroblock of the top field of the anchor picture in accordance with the prescribed search metric, and producing a third error metric for each comparison;

comparing pixels of the second portion of the current macroblock of the bottom field of the current picture with pixels of each of the plurality of correspondingly-sized portions of the macroblock of the bottom field of the anchor picture in accordance with the prescribed search metric, and producing a fourth error metric for each comparison;

summing the first and fourth error metrics to produce a first composite error metric;

summing the second and third error metrics to produce a second composite error metric; and determining which of the first, second, third, and fourth error metrics, and first and second composite error metrics has the lowest value, and selecting one of a plurality of possible motion estimation prediction modes on the basis of such determination.

18. The method as set forth in claim 17, wherein all of the comparing steps are performed concurrently, and both of the summing steps are performed concurrently.

19. The method as set forth in claim 18, wherein:

the first portion of the current macroblock of the top field of the current picture comprises a first half-portion of the current macroblock of the top field of the current picture; and, the second portion of the current macroblock of the bottom field of the current picture comprises a second half-portion of the current macroblock of the bottom field of the current picture.

20. The method as set forth in claim 19, wherein the dimensions of each of the first and second portions of the current macroblock of the top and bottom fields of the current picture are 16-by-8 pixels.

21. The method as set forth in claim 20, wherein the digital video data stream comprises an MPEG-2 digital video data stream.

22. The method as set forth in claim 18, wherein the plurality of possible motion estimation prediction modes includes frame and field prediction modes for frame pictures in accordance with the MPEG-2 standard.

23. The method as set forth in claim 19, wherein the plurality of possible motion estimation prediction modes includes frame and field prediction modes for frame pictures in accordance with the MPEG-2 standard.

24. A device that implements the method set forth in claim 19.

25. A method for motion coding a digital video data stream comprised of a sequence of pictures, the method including the steps of:

comparing pixels of a first portion of a top half of a current macroblock of a current picture with pixels of each of a plurality of correspondingly-sized portions of a macroblock of a top field of an anchor picture in accordance with a prescribed search metric, and producing a first error metric for each comparison;

comparing pixels of the first portion of the top half of the current macroblock of the current picture with pixels of each of the plurality of correspondingly-sized portions of a macroblock of a bottom field of the anchor picture in accordance with the prescribed search metric, and producing a second error metric for each comparison;

comparing pixels of a second portion of a bottom half of a current macroblock of the current picture with pixels of each of the plurality of correspondingly-sized portions of the macroblock of the top field of the anchor picture in accordance with the prescribed search metric, and producing a third error metric for each comparison;

comparing pixels of the second portion of the bottom half of the current macroblock of the current picture with pixels of each of the plurality of correspondingly-sized portions of the macroblock of the bottom field of the anchor picture in accordance with the prescribed search metric, and producing a fourth error metric for each comparison;

summing the first and third error metrics to produce a first composite error metric;

summing the second-and fourth error metrics to produce a second composite error metric; and determining which of the first, second, third, and fourth error metrics, and first and second composite error metrics has the lowest value, and selecting one of a plurality of possible motion estimation prediction modes on the basis of such determination.

26. The method as set forth in claim 25, wherein all of the comparing steps are performed concurrently, and both of the summing steps are performed concurrently.

27. The method as set forth in claim 26, wherein:

the first portion of the top half of the current macroblock of the current picture comprises a first half-portion of the top half of the current macroblock of the current picture; and, the second portion of the bottom half of the current macroblock of the current picture comprises a second half-portion of the bottom half of the current macroblock of the current picture.

28. The method as set forth in claim 27, wherein the dimensions of each of the first and second portions of the top and bottom halves of the current macroblock of the current picture are 16-by-8 pixels.

29. The method as set forth in claim 28, wherein the digital video data stream comprises an MPEG-2 digital video data stream.

30. The method as set forth in claim 25, wherein the plurality of possible motion estimation prediction modes includes field and 16×8 prediction modes for field pictures in accordance with the MPEG-2 standard.

31. The method as set forth in claim 26, wherein the plurality of possible motion estimation prediction modes includes field and 16×8 prediction modes for field pictures in accordance with the MPEG-2 standard.

32. A device that implements the method set forth in claim 26.

33. A method for motion coding a digital video data stream comprised of a sequence of pictures having top and bottom fields, the method including the steps of:

comparing pixels of a first portion of a current macroblock of the top field of a current picture with pixels of each of a plurality of correspondingly-sized portions of a macroblock of a top field of an anchor picture in accordance with a prescribed search metric, and producing a first error metric for each comparison;

comparing pixels of the first portion of the current macroblock of the top field of the current picture with pixels of each of the plurality of correspondingly-sized portions of a macroblock of a bottom field of the anchor picture in accordance with the prescribed search metric, and producing a second error metric for each comparison;

comparing pixels of a second portion of a current macroblock of the bottom field of the current picture with pixels of each of the plurality of correspondingly-sized portions of the macroblock of the top field of the anchor picture in accordance with the prescribed search metric, and producing a third error metric for each comparison;

comparing pixels of the second portion of the current macroblock of the bottom field of the current picture with pixels of each of the plurality of correspondingly-sized portions of the macroblock of the bottom field of the anchor picture in accordance with the prescribed search metric, and producing a fourth error metric for each comparison;

producing first, second, third, and fourth motion vectors on the basis of the first, second, third, and fourth error metrics, respectively; and, examining the first, second, third, and fourth motion vectors to determine whether a prescribed relationship between them is present, and if so, selecting a frame picture dual-prime motion estimation prediction mode.

34. The method as set forth in claim 33, wherein all of the comparing steps are performed concurrently.

35. A device that implements the method set forth in claim 34.

36. A method for motion coding a digital video data stream comprised of a sequence of pictures, the method including the steps of:

comparing pixels of a first portion of a top half of a current macroblock of a current picture with pixels of each of a plurality of correspondingly-sized portions of a macroblock of a top field of an anchor picture in accordance with a prescribed search metric, and producing a first error metric for each comparison;

comparing pixels of the first portion of the top half of the current macroblock of the current picture with pixels of each of the plurality of correspondingly-sized portions of a macroblock of a bottom field of the anchor picture in accordance with the prescribed search metric, and producing a second error metric for each comparison;

comparing pixels of a second portion of a bottom half of a current macroblock of the current picture with pixels of each of the plurality of correspondingly-sized portions of the macroblock of the top field of the anchor picture in accordance with the prescribed search metric, and producing a third error metric for each comparison;

comparing pixels of the second portion of the bottom half of the current macroblock of the current picture with pixels of each of the plurality of correspondingly-sized portions of the macroblock of the bottom field of the anchor picture in accordance with the prescribed search metric, and producing a fourth error metric for each comparison;

summing the first and third error metrics to produce a first composite error metric;

summing the second and fourth error metrics to produce a second composite error metric;

producing first and second motion vectors on the basis of the first and second composite error metrics, respectively; and, examining the first and second motion vectors to determine whether a prescribed relationship between them is present, and if so, selecting a field picture dual-prime motion estimation prediction mode.

37. The method as set forth in claim 36, wherein all of the comparing steps are performed concurrently, both of the summing steps are performed concurrently, and both of the producing steps are performed concurrently.

38. A device that implements the method set forth in claim 37.

39. A motion estimation search system that concurrently performs motion estimation using each of a plurality of different motion estimation prediction modes and then selects the prediction mode that produces the optimum result.

40. The motion estimation search system as set forth in claim 39, wherein the motion estimation search system is included in an MPEG-2 digital video encoder.

41. A method, including the steps of:

concurrently performing motion estimation using each of a plurality of different motion estimation prediction modes;

comparing the results produced using each different prediction mode; and, selecting the prediction mode that produced an optimum result; and, generating one or more motion vectors using the selected prediction mode.

42. The method as set forth in claim 41, wherein the prediction modes include at least a plurality of the prediction modes specified by the MPEG-2 standard.

* * * * *